United States Patent
Wei et al.

(10) Patent No.: US 12,186,948 B2
(45) Date of Patent: Jan. 7, 2025

(54) CERAMIC RESIN COMPOSITE HOUSING, PREPARATION METHOD THEREOF, AND TERMINAL

(71) Applicant: HONOR DEVICE CO., LTD., Shenzhen (CN)

(72) Inventors: Yameng Wei, Shenzhen (CN); Xianliang Liu, Shenzhen (CN); Ke Ding, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 278 days.

(21) Appl. No.: 17/636,978

(22) PCT Filed: Dec. 24, 2020

(86) PCT No.: PCT/CN2020/139055
§ 371 (c)(1),
(2) Date: Feb. 21, 2022

(87) PCT Pub. No.: WO2021/136063
PCT Pub. Date: Jul. 8, 2021

(65) Prior Publication Data
US 2022/0288824 A1    Sep. 15, 2022

(30) Foreign Application Priority Data

Dec. 30, 2019    (CN) .......................... 201911424962.9

(51) Int. Cl.
*B29C 45/14*    (2006.01)
*B29K 101/12*    (2006.01)
(Continued)

(52) U.S. Cl.
CPC ........ *B29C 45/14311* (2013.01); *B33Y 80/00* (2014.12); *H04M 1/026* (2013.01);
(Continued)

(58) Field of Classification Search
CPC . B32B 2250/02; B32B 9/005; B29K 2709/02; B29K 2101/12;
(Continued)

(56) References Cited

U.S. PATENT DOCUMENTS 5,749,721 A * 5/1998 Klinge .................... F23D 14/16
431/328
5,981,415 A    11/1999 Waku et al.
(Continued)

FOREIGN PATENT DOCUMENTS

CA        2303858 A1    4/1999
CN        104068595 A    10/2014
(Continued)

OTHER PUBLICATIONS

Qisheng WU,et al"Material physics performance(2nd edition)",East China University of Science and Technology press,Dec. 31, 2018,13 pages.
(Continued)

*Primary Examiner* — Alicia J Weydemeyer
(74) *Attorney, Agent, or Firm* — WOMBLE BOND DICKINSON (US) LLP

(57) ABSTRACT

A ceramic resin composite housing, including a ceramic member and a resin member that is molded on the ceramic member through injection molding. A surface that is of the ceramic member and that is bonded with the resin member includes a plurality of long-strip-shaped holes extending from the surface to the inside of the ceramic member. The long-strip-shaped holes have an open hole structure. The long-strip-shaped holes are filled with a resin material that constitutes the resin member. The composite housing has both a ceramic texture and appearance, and an internal fine structure formed by resin, the ceramic and the resin both are tightly bonded, and a bonding strength is high. The embodi-
(Continued)

ments of the present invention further provide a preparation method of the ceramic resin composite housing, and a terminal including the composite housing.

20 Claims, 5 Drawing Sheets

(51) Int. Cl.
*B29K 709/02* (2006.01)
*B29L 31/34* (2006.01)
*B33Y 80/00* (2015.01)
*H04M 1/02* (2006.01)

(52) U.S. Cl.
CPC ............... *B29C 2045/14327* (2013.01); *B29C 2045/14868* (2013.01); *B29K 2101/12* (2013.01); *B29K 2709/02* (2013.01); *B29L 2031/3481* (2013.01)

(58) Field of Classification Search
CPC ......... B29L 2031/3481; C04B 41/0072; B29C 2045/14327; B29C 2045/14868; B29C 45/14; B29C 45/14311; B29C 2045/14803
See application file for complete search history.

(56) References Cited

U.S. PATENT DOCUMENTS

| | | |
|---|---|---|
| 9,423,772 B2 | 8/2016 | Fernandez Ciurleo et al. |
| 10,800,711 B2 | 10/2020 | Chang et al. |
| 10,940,621 B2 | 3/2021 | Park et al. |
| 2019/0071369 A1* | 3/2019 | Chang ................. C04B 41/4896 |
| 2019/0159352 A1* | 5/2019 | Sun ..................... H04M 1/0283 |
| 2019/0322077 A1 | 10/2019 | Sun et al. |

FOREIGN PATENT DOCUMENTS

| | | | |
|---|---|---|---|
| CN | 106957183 A | | 7/2017 |
| CN | 107127863 A | * | 9/2017 |
| CN | 107567221 A | | 1/2018 |
| CN | 109016332 A | | 12/2018 |
| CN | 109093926 A | | 12/2018 |
| JP | S6016879 A | | 1/1985 |
| JP | H05246773 A | | 9/1993 |
| JP | H0885175 A | | 4/1996 |
| JP | 2004268936 A | | 9/2004 |
| JP | 2006327913 A | | 12/2006 |
| JP | 2019043129 A | | 3/2019 |
| RU | 2621229 C2 | | 6/2017 |
| TW | 201912611 A | | 4/2019 |
| WO | 0140544 A1 | | 6/2001 |
| WO | 2016199100 A1 | | 12/2016 |

OTHER PUBLICATIONS

Genbao Wen et al.,"Modern design of complex injection molds", Golden Shield Publishing House,Jul. 31, 2018,10 pages.
Shenyang College of Pharmacy,"Organic Chemistry",The People's Health Press,Dec. 31, 1978, 11pages.

* cited by examiner

CERAMIC RESIN COMPOSITE HOUSING, PREPARATION METHOD THEREOF, AND TERMINAL

CROSS-REFERENCE TO RELATED APPLICATIONS

This application is a national stage of International Application No. PCT/CN2020/139055, filed on Dec. 24, 2020, which claims priority to Chinese Patent Application No. 201911424962.9, filed on Dec. 30, 2019. The disclosures of the aforementioned applications are hereby incorporated by reference in their entireties.

TECHNICAL FIELD

Embodiments of the present invention relate to the field of terminal housing technologies, and in particular, to a ceramic resin composite housing, a preparation method thereof, and a terminal.

BACKGROUND

A ceramic material has good mechanical and electrical properties, and has a warm and jade-like texture in appearance. When used in a terminal device housing, the ceramic material can improve product performance and user experience. However, processing of the ceramic material and molding of a fine structure are difficult, resulting in a low yield rate and high costs. Resin has advantages of a good comprehensive mechanical property and easy molding, which facilitates fine structure molding and features considerable design freedom. In addition, a resin material has small density, and has a good weight reduction function when the resin material is used for molding a housing of an intelligent terminal. To comprehensively utilize the advantages of the two materials, the ceramic material and the resin material are used to form a composite in the industry. However, the ceramic material and the resin material differ greatly in physical and chemical properties. Consequently, it is difficult to achieve a micro-level tight connection, and a bonding strength of a bonding interface between the ceramic material and the resin material is not high.

SUMMARY

In view of this, embodiments of the present invention provide a ceramic resin composite housing, to resolve an existing problem of a low strength of bonding between ceramic and resin to some extent.

Specifically, a first aspect of the embodiments of the present invention provides a ceramic resin composite housing, including a ceramic member and a resin member that is molded on the ceramic member through injection molding. A surface that is of the ceramic member and that is bonded with the resin member includes a plurality of long-strip-shaped holes extending from the surface to the inside of the ceramic member. The long-strip-shaped holes have an open hole structure. Pore sizes of the long-strip-shaped holes range from 700 nm to 500 µm, and lengths of at least some of the long-strip-shaped holes are greater than 100 µm and less than or equal to 1000 µm. The long-strip-shaped holes are filled with a resin material that constitutes the resin member.

In an implementation of the present invention, the long-strip-shaped holes are formed through loss on ignition of organic fibers, and the long-strip-shaped holes extend in a winding manner from the surface of the ceramic member to the inside of the ceramic member.

In an implementation of the present invention, pore sizes at all positions of the long-strip-shaped holes are the same or basically the same.

In an implementation of the present invention, the pore sizes of the long-strip-shaped holes gradually increase as the long-strip-shaped holes extend from the surface of the ceramic member to the inside of the ceramic member.

In an implementation of the present invention, the pore sizes of the long-strip-shaped holes gradually decrease as the long-strip-shaped holes extend from the surface of the ceramic member to the inside of the ceramic member.

In an implementation of the present invention, a volume proportion of the plurality of long-strip-shaped holes in the ceramic member is 1% to 35%.

In an implementation of the present invention, an area proportion of the plurality of long-strip-shaped holes on the surface that is of the ceramic member and that is bonded with the resin member ranges from 1% to 60%.

In an implementation of the present invention, the pore sizes of some or all of the long-strip-shaped holes range from 15 µm to 500 µm.

In an implementation of the present invention, the plurality of long-strip-shaped holes are evenly distributed on the surface that is of the ceramic member and that is bonded with the resin member.

In an implementation of the present invention, the surface that is of the ceramic member and that is bonded with the resin member further includes a plurality of non-long-strip-shaped holes, where the non-long-strip-shaped holes are filled with the resin material that constitutes the resin member.

In an implementation of the present invention, a material of the ceramic member includes one or more of an oxide ceramic material, a nitride ceramic material, and a carbide ceramic material.

In an implementation of the present invention, a material of the resin member is thermoplastic resin.

In an implementation of the present invention, the resin member further includes a reinforcing component, where the reinforcing component includes one or more of glass fibers, carbon fibers, glass flakes, calcium carbonate, magnesium carbonate, silica, and talc.

In an implementation of the present invention, the resin member may be of an integrated structure, or may include a plurality of separate structures bonded to the surface of the ceramic member.

The ceramic resin composite housing provided in the first aspect of the embodiments of the present invention includes the ceramic member and the resin member that are composited into an integrated structure, where the ceramic member includes the micron-level and/or submicron-level long-strip-shaped holes that extend from the surface to the inside, and a part of the resin material infiltrates into the long-strip-shaped holes, so that a micro-level tight bond is formed on the bonding interface between the ceramic member and the resin member, and a bonding strength is high. The resin material that infiltrates into the ceramic member also toughens the ceramic member. In addition, the long-strip-shaped holes have small pore sizes. Therefore, integrity of the ceramic is not significantly damaged, and a mechanical property of a ceramic substrate is less weakened.

According to a second aspect, the embodiments of the present invention further provide a preparation method of a ceramic resin composite housing, including:

preparing a ceramic member with a preset shape by using organic fibers as a pore-forming agent, where a surface that is of the ceramic member and on which injection molding is pre-performed includes a plurality of long-strip-shaped holes that extend from the surface to the inside of the ceramic member, the long-strip-shaped holes are formed through loss on ignition of the organic fibers, the long-strip-shaped holes have an open hole structure, pore sizes of the long-strip-shaped holes range from 700 nm to 500 nm, and lengths of at least some of the long-strip-shaped holes are greater than 100 μm and less than or equal to 1000 nm;

performing impregnation on the ceramic member by using an aqueous solution that includes a nitrogen compound to enable the aqueous solution that includes the nitrogen compound to enter the long-strip-shaped holes, and then performing drying to attach a layer of the nitrogen compound to inner walls of the long-strip-shaped holes; and performing injection molding on the dried ceramic member, enabling a resin liquid to enter the long-strip-shaped holes to have an exothermic reaction with the nitrogen compound, and performing fine structure processing on a resin part after the injection molding is completed, to obtain a ceramic resin composite housing.

In an implementation of the present invention, the nitrogen compound includes one or more of ammonia, a hydrazine compound and its derivative, and a water-soluble amine.

In an implementation of the present invention, a specific method for the preparing a ceramic member with a preset shape by using organic fibers as a pore-forming agent includes one or more of an injection molding method, a tape casting method, a 3D printing method, a hot pressing method, and a slurry dipping and sanding method.

In an implementation of the present invention, the preparing a ceramic member with a preset shape by using organic fibers as a pore-forming agent includes: mixing ceramic powder, the organic fibers, and a bonding agent to prepare a ceramic member green body, and sintering the ceramic member green body to obtain the ceramic member.

In an implementation of the present invention, the organic fiber includes at least one of an artificial fiber and a natural fiber on which loss on ignition can be performed.

In an implementation of the present invention, the impregnation process is performed in a vacuum condition.

In an implementation of the present invention, ultrasonic vibration is performed in the impregnation process.

In an implementation of the present invention, a manner of the drying is air drying or freeze drying, and a temperature for the air drying ranges from 10° C. to 80° C.

The preparation method provided in the second aspect of the embodiments of the present invention implements a tight bond between ceramic and resin under dual effects of physical embedding and a chemical reaction. On the one hand, the long-strip-shaped holes that extend to the inside of the ceramic member are prepared through the loss on ignition of the organic fibers, and the resin infiltrates into the long-strip-shaped holes to enhance bonding of the resin and the ceramic. On the other hand, the nitrogen compound is attached to the inner walls of the long-strip-shaped holes through the impregnation; and in the injection molding process, the nitrogen compound has an exothermic reaction with the resin that infiltrates into the holes, to provide heat to keep a front end of a resin liquid flow continuously in a low-viscosity flow state. In this way, the resin infiltrates into the long-strip-shaped holes smoothly, and the following problem is avoided: The resin cannot smoothly infiltrate into the holes because of an increase in viscosity of the front end of the resin liquid flow due to cooling. In addition, in the embodiments of the present invention, the holes are formed through the loss on ignition of the organic fibers. Integrity of a ceramic structure is not significantly damaged, and a strong acid and a strong alkali are not required. The loss on ignition of the organic fibers is completed in the ceramic sintering process, which is environment-friendly and energy-saving.

The embodiments of the present invention further provide a terminal, including the ceramic resin composite housing according to the first aspect of the embodiments of the present invention. The ceramic resin composite housing may serve as a housing structure, such as a front cover, a middle frame, or a rear cover, of the terminal. The housing of the terminal provided in the embodiments of the present invention has both a ceramic texture and appearance, and an internal fine structure formed by resin, thereby improving market competitiveness.

The embodiments of the present invention further provide a mobile phone, including a display, a housing assembled on an outer side of the mobile phone, and a mainboard and a battery that are located inside the housing. The entire or a part of the housing is the ceramic resin composite housing according to any implementation of the first aspect of the embodiments of the present invention.

In an implementation of the present invention, the housing includes a rear cover assembled on a rear side of the mobile phone. Alternatively, the housing includes a front cover assembled on a front side of the mobile phone. Alternatively, the housing includes a middle frame assembled in the mobile phone. Alternatively, the housing includes one or more of a rear cover, a front cover, and a middle frame.

The middle frame is located between the front cover and the rear cover of the mobile phone. Alternatively, the middle frame is located between the display and the rear cover of the mobile phone.

In an implementation of the present invention, the rear cover and the middle frame are of an integrated structure or separate structures.

In an implementation of the present invention, the rear cover is a ceramic resin composite housing, where a ceramic member forms a main appearance body of the rear cover of the mobile phone, and presents a ceramic appearance and texture, and a resin member forms functional structures of a frame of the rear cover and an inner side of the rear cover. Therefore, the rear cover has both a ceramic texture and appearance and an internal fine functional structure.

DESCRIPTION OF EMBODIMENTS

The following describes the embodiments of the present invention with reference to the accompanying drawings in the embodiments of the present invention.

The embodiments of the present invention provide a ceramic resin composite housing that may be applied to a housing of a terminal, so that the terminal housing has both a ceramic appearance and texture, and an internal fine structure formed by resin, thereby improving market competitiveness of a terminal product. The terminal may be a mobile phone, or may be an electronic product such as a tablet computer, a notebook computer, a portable computer, or an intelligent wearable product. A part of the terminal housing or the entire terminal housing may be the ceramic resin composite housing provided in the embodiments of the present invention. The terminal housing is an external structural member that is configured to protect internal components of the terminal and can be directly seen and touched by a user.

Figure 1:
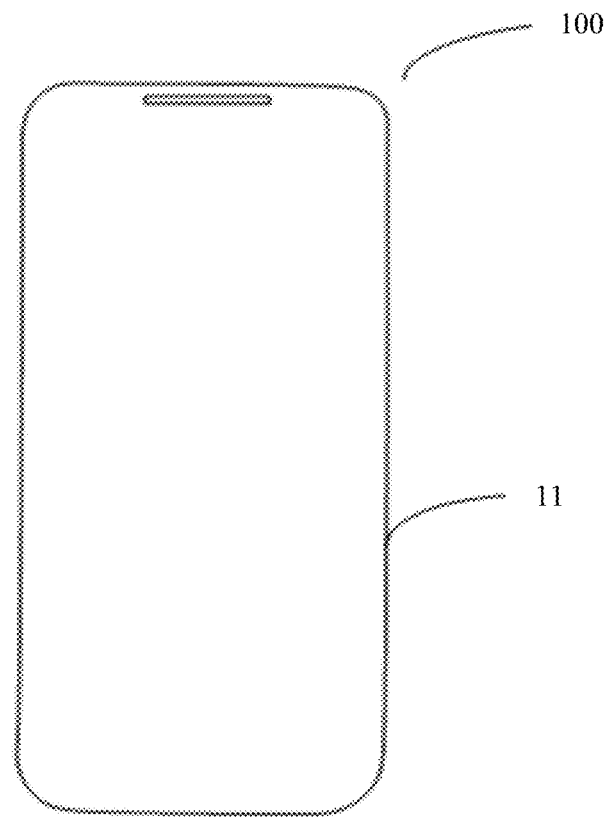
FIG. 1 is a schematic structural diagram of a mobile phone 100 according to an embodiment of the present invention.
Figure 2:
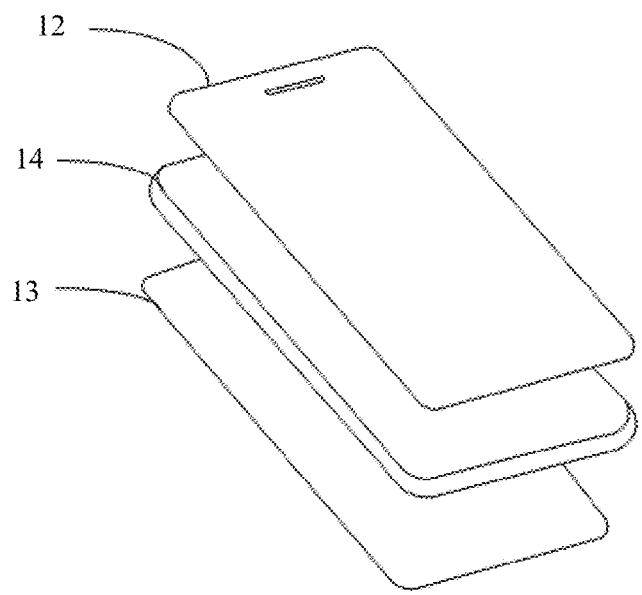
FIG. 2 is a schematic structural diagram of a mobile phone housing 11 according to an embodiment of the present invention.

A mobile phone 100 is used as an example. FIG. 1 is a schematic structural diagram of a mobile phone 100 according to an embodiment of the present invention. The mobile phone 100 includes a housing 11 assembled on an outer side of the mobile phone100, and components such as a mainboard and a battery that are located inside the housing 11. As shown in FIG. 2, the housing 11 may specifically include a front cover 12 assembled on a front side (that is, a display side) of the mobile phone 100, or may include a rear cover 13 assembled on a rear side of the mobile phone 100. In some implementations of the present invention, the housing 11 may further include a middle frame 14 located between the front cover 12 and the rear cover 13, and the middle frame 14 is configured to bear components such as the mainboard and the battery. In an implementation of the present invention, the front cover 12, the rear cover 13, and/or the middle frame 14 are/is integrally the ceramic resin composite housing provided in the embodiments of the present invention, or a part of the front cover 12, the rear cover 13, and/or the middle frame 14 is the ceramic resin composite housing. For example, a part of the rear cover 13 or a part of the front cover 12 or the middle frame 14 is the ceramic resin composite housing. In some implementations of the present invention, the rear cover 13 and the middle frame 14 may be an integrated structure. In some other implementations of the present invention, the rear cover 13 and the middle frame 14 may alternatively be of separate structures. The mobile phone 100 further includes a display. In a mobile phone with a bezel-less screen, a housing usually does not include a front cover, and a middle frame is located between a display and a rear cover 13. Alternatively, in some mobile phones with a bezel-less screen, a housing may not include an exposed middle frame.

Figure 3:
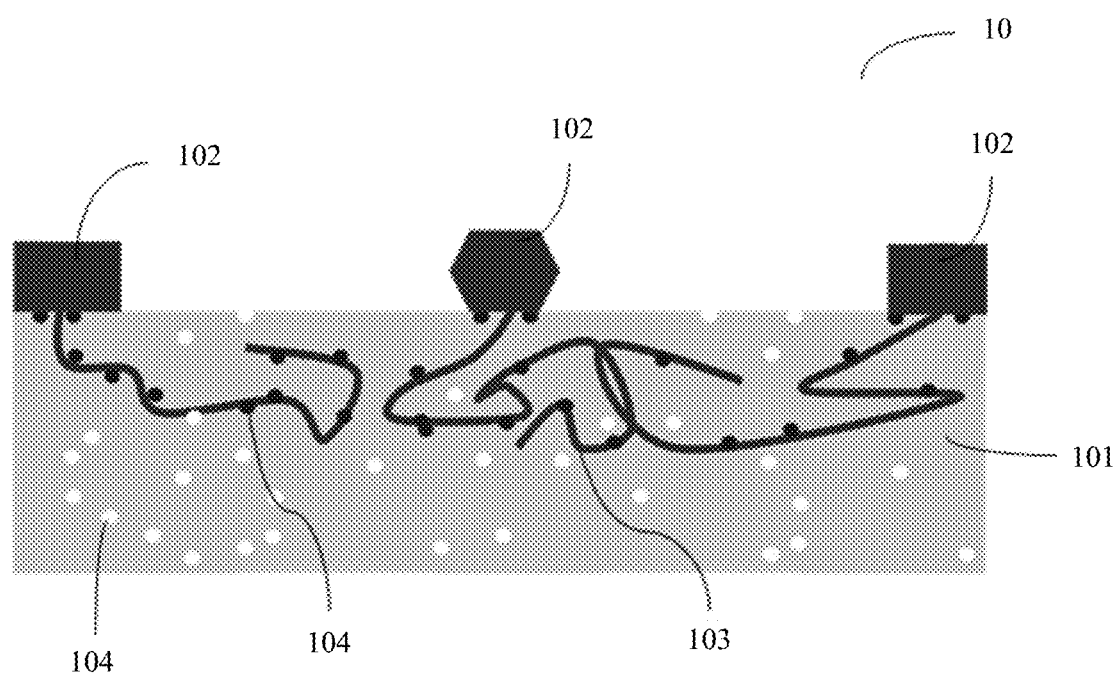
FIG. 3 is a schematic structural diagram of a ceramic resin composite housing according to an embodiment of the present invention.

As shown in FIG. 3, a ceramic resin composite housing 10 provided in the embodiments of the present invention includes a ceramic member 101 and a resin member 102 that is molded on the ceramic member 101 through injection molding. A surface that is of the ceramic member 101 and that is bonded with the resin member 102 includes a plurality of long-strip-shaped holes 103 extending from the surface of the ceramic member 101 to the inside of the ceramic member 101. The long-strip-shaped holes 103 have an open hole structure. Pore sizes of the long-strip-shaped holes 103 range from 700 nm to 500 μm. Lengths of at least some of the long-strip-shaped holes 103 are greater than 100 μm and less than or equal to 1000 μm. The long-strip-shaped holes 103 are filled with a resin material that constitutes the resin member 102.

In the ceramic resin composite housing 10 provided in the embodiments of the present invention, integrated molding of ceramic and resin can be completed by using a mature injection molding process, and the composite housing has a ceramic appearance and texture, and also has a fine structure formed by the resin material. The ceramic member 101 includes the micron-level and/or submicron-level long-strip-shaped holes 103 that extend from the surface to the inside, and the resin material infiltrates into the long-strip-shaped holes 103, so that a micro-level tight bond is formed on the bonding interface between the ceramic member 101 and the resin member, and a bonding strength is high. In addition, the resin material that infiltrates into the ceramic member 101 also has a similar fiber toughening effect on the ceramic member 101, and interface energy required for cracking the ceramic member 101 is improved through a pull-out effect. Therefore, compared with a pure ceramic substrate, the ceramic resin composite housing in the embodiments of the present invention has better toughness, and has a lower probability of damage in a case of impact load such as falling. The long-strip-shaped holes 103 in the embodiments of the present invention do not significantly damage integrity of the ceramic, and a mechanical property of a ceramic substrate is less weakened. In addition, compared with the pure ceramic substrate, the ceramic resin composite housing 10 in the embodiments of the present invention has a lower density, which is beneficial to weight reduction of a terminal device.

In an implementation of the present invention, the long-strip-shaped holes 103 are formed through loss on ignition of organic fibers. The long-strip-shaped fiber-like holes that extend from the surface of the ceramic member 101 to the inside of the ceramic member 101 are formed in the ceramic member 101 by using a fiber loss-on-ignition method. In a macroscopic view, the long-strip-shaped hole 103 can form an undercut structure, and its glue pulling effect is better than that of a granular hole. Therefore, the strength of bonding between the ceramic and the resin can be improved. In a microscopic view, the long-strip-shaped holes 103 can activate and connect to internal closed holes of the ceramic member 101, the holes are filled with the resin material (as shown in FIG. 3) after the injection molding, and there is the pull-out effect in the damage process, thereby further improving the bonding strength.

In an implementation of the present invention, the long-strip-shaped holes 103 extend in a winding manner from the surface of the ceramic member 101 to the inside of the ceramic member 101. The resin material infiltrates into the long-strip-shaped holes 103 that extend in the winding manner, which is more beneficial to improvement of the strength of interface bonding between the ceramic and the resin through the pull-out effect.

In an implementation of the present invention, the long-strip-shaped hole 103 has an open hole structure, where an open end of the long-strip-shaped hole 103 is located on the surface that is of the ceramic member 101 and that is bonded with the resin member 102, and a closed end of the long-strip-shaped hole 103 is located inside the ceramic member 101. The resin material may enter the long-strip-shaped hole 103 from the open end. In an implementation of the present invention, the long-strip-shaped holes 103 are formed through the loss on ignition of the organic fibers. Therefore, a pore size of the long-strip-shaped hole 103 is determined by a thickness of the organic fiber, and the pore size is easy to be controlled. In an implementation of the present invention, the pore sizes of the plurality of long-strip-shaped holes 103 may be the same, or may be different.

In an implementation of the present invention, pore sizes at all positions of the long-strip-shaped holes 103 may be the same or basically the same; or the pore sizes of the long-strip-shaped holes 103 gradually increase as the long-strip-shaped holes 103 extend from the surface of the ceramic member 101 to the inside of the ceramic member 101; or the pore sizes of the long-strip-shaped holes 103 gradually decrease as the long-strip-shaped holes 103 extend from the surface of the ceramic member 101 to the inside of the ceramic member 101. The pore sizes at all positions are the same or basically the same, which facilitates preparation. The pore sizes gradually increase as the long-strip-shaped holes 103 extend from the surface of the ceramic member 101 to the inside of the ceramic member 101, which helps form better undercut structures and improve the bonding strength. The pore sizes gradually decrease as the long-strip-shaped holes 103 extend from the surface of the ceramic member 101 to the inside of the ceramic member 101, which facilitates infiltration of the resin material, so that the resin smoothly fills the holes. In an embodiment of the present invention, the foregoing three forms of the long-strip-shaped holes 103 may exist at the same time, or only one or two of the foregoing three forms may exist. Certainly, in some other implementations of the present invention, it may further be that the pore sizes of the long-strip-shaped holes 103 change irregularly as the long-strip-shaped holes 103 extend from the surface of the ceramic member 101 to the inside of the ceramic member 101.

In an implementation of the present invention, to enable the resin material to better infiltrate into the long-strip-shaped holes 103, the pore sizes of some or all of the long-strip-shaped holes 103 range from 15 μm to 500 μm.

In an implementation of the present invention, to ensure that the ceramic has a higher strength, a volume proportion of the plurality of long-strip-shaped holes 103 in the ceramic member 101 is 1% to 35%. Further, the volume proportion of the plurality of long-strip-shaped holes 103 in the ceramic member 101 may be controlled to be between 10% and 25%. An appropriate volume proportion of the long-strip-shaped holes 103 can ensure a high strength of bonding between the ceramic and the resin, and enable the ceramic member 101 body to have a high strength.

In an implementation of the present invention, to ensure a tight bond between the ceramic and the resin, an area proportion of the plurality of long-strip-shaped holes 103 on the surface that is of the ceramic member 101 and that is bonded with the resin member ranges from 1% to 60%. Further, the area proportion of the plurality of long-strip-shaped holes 103 may range from 10% to 30%. An appropriate area proportion of the long-strip-shaped holes 103 can ensure a high strength of bonding between the ceramic and the resin.

In an implementation of the present invention, to form a better bond between the ceramic and the resin, the plurality of long-strip-shaped holes 103 are evenly distributed on the surface that is of the ceramic member 101 and that is bonded with the resin member.

In an implementation of the present invention, because the long-strip-shaped holes 103 are formed through the loss on ignition of the organic fibers, a small quantity of long-strip-shaped holes 103 having a closed hole structure may also exist inside the ceramic member 101 due to a fiber distribution problem. That is, when some fibers are distributed only inside the ceramic, and do not extend to the ceramic surface, long-strip-shaped holes 103 having a closed hole structure are formed inside the ceramic after the loss on ignition of the organic fibers. A closed hole refers to a cavity and a pore channel in a porous solid that are not connected to the outside, and an open hole refers to a cavity and a pore channel in a porous solid that are connected to the outside.

In an implementation of the present invention, the surface and the inside of the ceramic member 101 may further include a plurality of non-long-strip-shaped holes 104. These non-long-strip-shaped holes 104 are not formed through loss on ignition of fibers, but are inevitably generated due to a raw material or another reason in a firing process of the ceramic. Shapes of the non-long-strip-shaped holes 104 are not limited, and may be regular or irregular shapes. For example, the non-long-strip-shaped holes 104 may be spherical or quasi-spherical holes, and pore sizes of the non-long-strip-shaped holes 104 are mostly micron-level and/or submicron-level. Some of these non-long-strip-shaped holes 104 are distributed on the surface of the ceramic member 101 and have an open hole structure, and some of these non-long-strip-shaped holes 104 are distributed inside the ceramic member 101 and have a closed hole structure. As shown in FIG. 3, the long-strip-shaped holes 103 having the open hole structure can activate and connect to some of the closed non-long-strip-shaped holes 104 inside the ceramic member 101, so that the closed non-long-strip-shaped holes 104 are also filled with the resin material after the injection molding, thereby further improving the bonding strength.

In an implementation of the present invention, to ensure a strength of the ceramic, a total volume proportion of various holes inside the ceramic member 101 is controlled to not exceed 40%. Further, a total volume proportion of various holes inside the ceramic member 101 is controlled to not exceed 30%. Furthermore, a total volume proportion of various holes inside the ceramic member 101 may not exceed 25%.

In an implementation of the present invention, a material of the ceramic member 101 includes one or more of an oxide ceramic material, a nitride ceramic material, and a carbide ceramic material. Specifically, the oxide ceramic material may be, for example, one or more of alumina, zirconia, silicon oxide, and kaolin; the nitride ceramic material may be, for example, one or more of silicon nitride and boron nitride; and the carbide ceramic material may be, for example, silicon carbide. In an implementation of the present invention, the ceramic member 101 may be a ceramic flat plate with a thickness of 0.25 mm to 0.7 mm.

In an implementation of the present invention, a material of the resin member is thermoplastic resin. The resin material can be bonded to the ceramic member 101 through the mature injection molding process, which facilitates molding of a complex and fine structure, has a comparatively high degree of freedom in structural design, and features convenient processing and low costs. Specifically, the thermoplastic resin may be one or more of polyester resin and polyamide resin, and specifically the polyamide resin may be aliphatic polyamide resin, aromatic polyamide resin, or a mixture of aliphatic polyamide resin and aromatic polyamide resin.

In an implementation of the present invention, to optimize a mechanical property of the resin member, the resin member may further include a reinforcing component, where the reinforcing component may include one or more of glass fibers, carbon fibers, glass flakes, calcium carbonate, magnesium carbonate, silica, and talc.

In an implementation of the present invention, specific shapes and structures of the ceramic member 101 and the resin member are not limited, and the ceramic member 101 and the resin member may be molded according to an actual product requirement. The resin member may be of an integrated structure, or may include a plurality of separate structures bonded to the surface of the ceramic member 101.

Figure 4A:
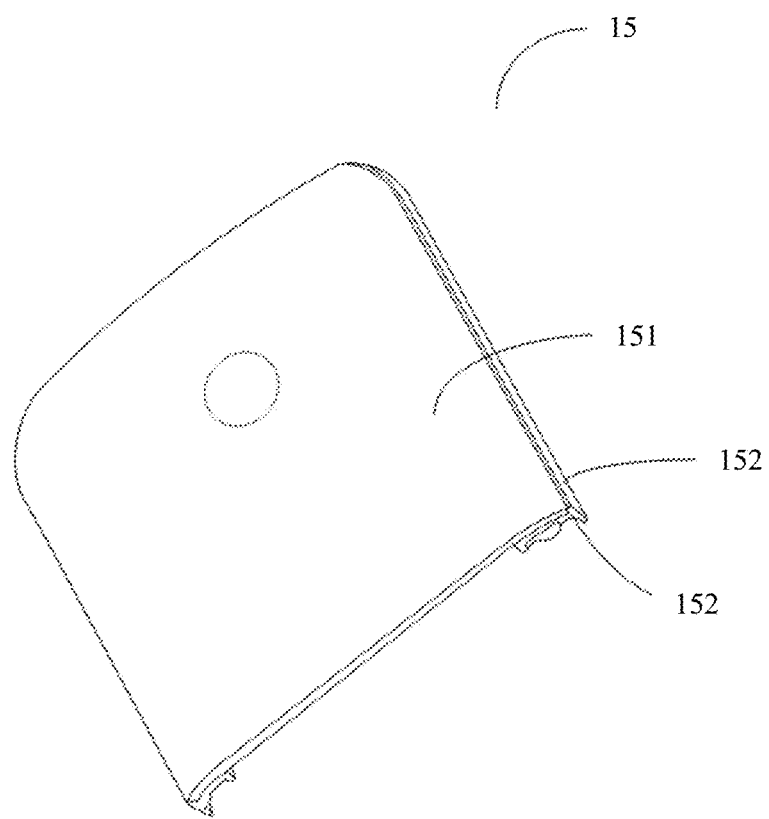
FIG. 4A and FIG. 4B are partial schematic structural diagrams of a front surface and a rear surface of a rear cover of a mobile phone respectively according to an embodiment of the present invention.
Figure 4B:
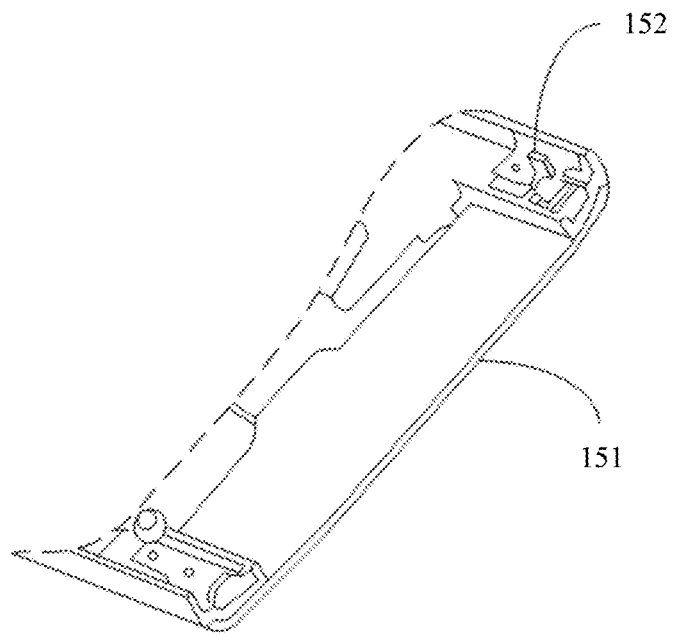

FIG. 4A and FIG. 4B are schematic structural diagrams of a rear cover 15 of a mobile phone 100 according to a specific embodiment of the present invention. The rear cover 15 has both a warm and jade-like ceramic member 151 and a resin member 152 that has a fine structure. In this embodiment, the ceramic member 151 forms a main appearance body of the rear cover 15 of the mobile phone 100, and presents a ceramic appearance and texture; and the resin member 152 forms functional structures of a frame of the rear cover 15 and an inner side of the rear cover 15, which facilitates fine processing. In daily use, the ceramic member is less exposed to direct impact, reducing a probability of damage. In addition, a micron-level and/or submicron-level bonding is implemented on a surface between the ceramic member 151 and the resin member 152, and a bonding strength is high. In addition, resin that infiltrates into the ceramic member 151 can also have a fiber toughening effect, which further optimizes resistance of the composite housing to impact and damage.

The ceramic resin composite housing provided in the embodiments of the present invention includes the ceramic member and the resin member that are composited into an integrated structure, where the ceramic member includes the micron-level and/or submicron-level long-strip-shaped holes 103 that extend from the surface to the inside, and the resin material partially infiltrates into the long-strip-shaped holes 103, so that a micro-level tight bond is formed on the bonding interface between the ceramic member and the resin member, and a bonding strength is high. The resin material that infiltrates into the ceramic member also toughens the ceramic member. In addition, the long-strip-shaped holes 103 have small pore sizes. Therefore, integrity of the ceramic is not significantly damaged, and a mechanical property of a ceramic substrate is less weakened.

Correspondingly, an embodiment of the present invention further provides a preparation method of a ceramic resin composite housing, including the following steps.

Figure 5:
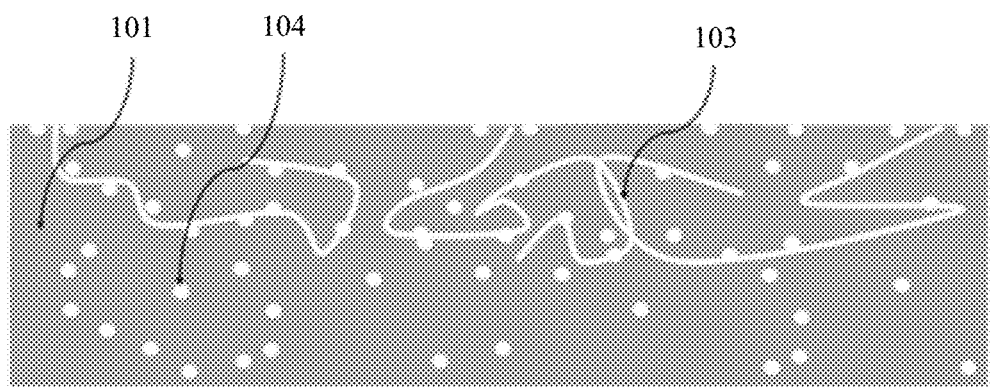
FIG. 5 is a schematic structural diagram of a ceramic member prepared in step S101 of a preparation method according to an embodiment of the present invention.

S101: Prepare a ceramic member with a preset shape by using organic fibers as a pore-forming agent, where a surface that is of the ceramic member and on which injection molding is pre-performed includes a plurality of long-strip-shaped holes 103 that extend from the surface to the inside of the ceramic member, the long-strip-shaped holes 103 are formed through loss on ignition of the organic fibers, the long-strip-shaped holes 103 have an open hole structure, pore sizes of the long-strip-shaped holes 103 range from 700 nm to 500 µm, and lengths of at least some of the long-strip-shaped holes 103 are greater than 100 µm and less than or equal to 1000 µm. FIG. 5 is a schematic structural diagram of a ceramic member including long-strip-shaped holes 103, where 103 is the long-strip-shaped hole 103 having the open hole structure.

S102: Perform impregnation on the ceramic member by using an aqueous solution that includes a nitrogen compound to enable the aqueous solution that includes the nitrogen compound to enter the long-strip-shaped holes 103, and then perform drying to attach a layer of the nitrogen compound to inner walls of the long-strip-shaped holes 103.

Figure 6:
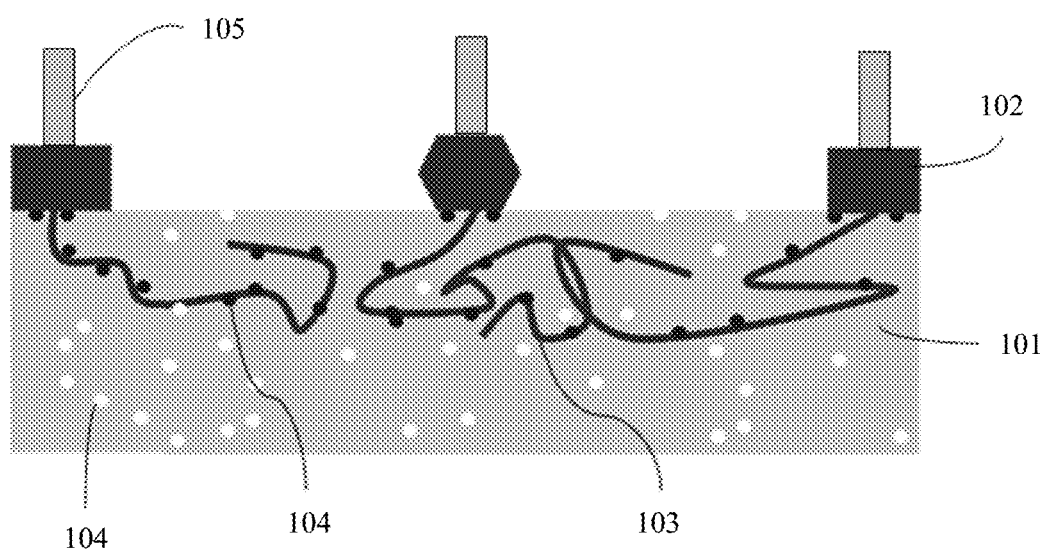
FIG. 6 is a schematic diagram of composition of ceramic and resin in an injection molding process in step S102 of a preparation method according to an embodiment of the present invention.

S103: Perform injection molding on the dried ceramic member, enable a resin liquid to enter the long-strip-shaped holes 103 to have an exothermic reaction with the nitrogen compound, and perform fine structure processing on a resin part after the injection molding is completed, to obtain a ceramic resin composite housing. FIG. 6 is a schematic diagram of composition of ceramic and resin in an injection molding process, where 105 is a runner in which the resin liquid flows in the injection molding process.

In an implementation of the present invention, in step S101, an artificial fiber and/or a natural fiber on which loss on ignition can be performed may be selected and used as the organic fiber. Specifically, for example, the organic fiber may be but is not limited to one or more of a nylon fiber, an explosion-proof fiber, and natural wood chips. Diameters of the organic fibers range from 700 nm to 500 µm, and lengths of at least some of the organic fibers are greater than 100 µm and less than or equal to 1000 µm. The diameters and lengths of the organic fibers directly determine pore sizes and lengths of the long-strip-shaped holes 103 that are formed finally. A quantity of organic fibers added is controlled to be between 0.1 wt % and 5 wt %. Addition of an appropriate quantity of organic fibers cannot only form sufficient holes, but also avoid excessive weakening of a ceramic substrate. The ceramic member is prepared by using the organic fibers as the pore-forming agent, and sizes of the holes in the ceramic member are easy to be controlled. The ceramic member does not include macroscopic holes, but instead includes a large quantity of micron-level and/or submicron-level long-strip-shaped holes 103 leading to the inside of the ceramic substrate.

In an implementation of the present invention, a specific preparation method of the ceramic member with the preset shape is not limited. The ceramic member with the preset shape may be prepared by using one or more of an injection molding method, a tape casting method, a 3D printing method, a hot pressing method, and a slurry dipping and sanding method, where a layer-by-layer slurry dipping method can better control distribution of holes, and regulate a distribution gradient of the holes along a thickness direction of the ceramic member. In some implementations of the present invention, it may be that a proportion of holes on the surface of the ceramic is high, and a proportion of holes inside the ceramic is low, so that injection molding is easy. In some other implementations of the present invention, it may alternatively be that a proportion of holes inside the ceramic is high, and a proportion of holes on the surface of the ceramic is low, so that an undercut structure is stronger. Specifically, regulation may be performed according to specific requirements of a product.

In this embodiment of the present invention, a specific preparation process of the ceramic member with the preset shape may be as follows: mixing ceramic powder, the organic fibers, and a bonding agent to prepare a ceramic member green body, and sintering the ceramic member green body to obtain the ceramic member. A particle size of the ceramic powder is between 0.1 µm and 100 µm. A type of the ceramic powder may be one or more of an oxide ceramic material, a nitride ceramic material, and a carbide ceramic material. Specifically, the oxide ceramic material may be, for example, one or more of alumina, zirconia, silicon oxide, and kaolin (essentially an aluminum silicon oxide compound); the nitride ceramic material may be, for example, one or more of silicon nitride and boron nitride; and the carbide ceramic material may be, for example, silicon carbide. Silica sol, zirconium sol, water glass, zirconium diacetate, or the like may be selected and used as the bonding agent. After the preparation of the green body is completed, the green body can be roasted at 850° C. to 1550° C. for 30 minutes to 24 hours and then cooled in a furnace to complete the preparation of the ceramic member. Certainly, there are various types of ceramic, and roasting requirements of different ceramic vary greatly. Therefore, the foregoing roasting conditions are only common roasting parameters, and a roasting parameter of special ceramic may not fall within the foregoing range.

In this embodiment of the present invention, the ceramic member may be a ceramic flat plate with a thickness of 0.25 mm to 0.7 mm.

In a specific embodiment of the present invention, alumina powder with a median particle diameter of 2 μm is selected and used as the ceramic powder; 30 wt % silica sol is selected and used as the bonding agent; and nylon fibers with a diameter of 10 μm are selected and used as the organic fibers, where lengths of at least some of the nylon fibers are greater than 100 μm and less than or equal to 200 μm, and a quantity of nylon fibers added is 1.2 wt %. The ceramic member is a flat plate with a thickness of 0.7 mm.

In an implementation of the present invention, the holes are formed inside the ceramic in the organic fiber loss-on-ignition manner; and the obtained holes can extend into the ceramic, are not limited to the surface of the ceramic, and can be distributed throughout the entire ceramic substrate if necessary. Second, the method does not require use of various types of acids and alkalis, and achieves a good environmental protection effect. Moreover, the organic fiber loss-on-ignition process is implemented synchronously in the ceramic sintering process, which has a good energy saving effect.

In an implementation of the present invention, the long-strip-shaped holes 103 are open holes, the pore sizes of the long-strip-shaped holes 103 range from 700 nm to 500 μm, and lengths of at least some of the long-strip-shaped holes 103 are greater than 100 μm and less than or equal to 1000 μm. The long-strip-shaped holes 103 of specific lengths can better extend into the ceramic.

In an implementation of the present invention, in step S102, the nitrogen compound includes one or more of ammonia, a hydrazine compound and its derivative, and a water-soluble amine. A concentration of the aqueous solution that includes the nitrogen compound may range from 1 wt % to 35 wt %, and specifically may be, for example, 5 wt %, 10 wt %, 20 wt %, 30 wt %, or 35 wt %. Impregnation duration may be 2 minutes to 60 minutes, and specific duration is determined based on morphology of the holes in the ceramic member. Deeper holes and smaller pore sizes require longer impregnation duration. For example, the impregnation duration may be 20 minutes, 30 minutes, 40 minutes, 50 minutes, or 60 minutes.

In an embodiment of the present invention, to enable the aqueous solution that includes the nitrogen compound to enter the long-strip-shaped holes 103 more smoothly and maintain full contact with inner walls of the long-strip-shaped holes 103, a vacuum condition and/or ultrasonic vibration auxiliary treatment are/is used in the impregnation process. The ultrasonic treatment can also promote a release of gas from the long-strip-shaped holes 103 that have the open hole structure, thereby facilitating the entry of the aqueous solution that includes the nitrogen compound into the holes.

In an implementation of the present invention, a manner of performing drying on the ceramic member obtained after the impregnation may be air drying or freeze drying, where a temperature of the air drying ranges from 10° C. to 80° C., a wind speed may range from 3 m/s to 8 m/s, and duration may range from 10 hours to 24 hours. Control of an appropriate temperature can reduce loss of a nitrogen element. In a specific implementation of the present invention, side-blowing air drying may be used. A wind speed of side blowing is 5 m/s, and duration is 24 hours. According to a principle of hydromechanics, side blowing achieves a better effect when deep holes are dried. A layer of the nitrogen compound is attached to the inner walls of the holes after the drying is performed. In the injection molding process, the nitrogen compound has an exothermic reaction with the resin to promote infiltration of the resin liquid into the holes.

In an implementation of the present invention, in step S103, the dried ceramic member is placed into an injection molding mold for injection molding. An injection molding material is thermoplastic resin. This type of resin can have an exothermic reaction between esters and amines, with the nitrogen compound on the inner walls of the holes. Specifically, the thermoplastic resin may be one or more of polyester resin and polyamide resin, and specifically the polyamide resin may be aliphatic polyamide resin, aromatic polyamide resin, or a mixture of aliphatic polyamide resin and aromatic polyamide resin. Specific injection molding parameters can be determined based on a type of a raw resin material. Usually, an injection port temperature ranges from 220° C. to 400° C., and a mold temperature ranges from 180° C. to 400° C. Further, the injection port temperature ranges from 295° C. to 320° C., and the mold temperature ranges from 230° C. to 260° C. In an injection process, high-temperature resin melt with good fluidity enters the long-strip-shaped holes 103 in the ceramic member under high pressure, and has an exothermic reaction between esters and amines, with the nitrogen compound on the inner walls of the holes. In this way, a temperature at a front end of a resin liquid flow does not drop sharply, and the front end can continuously remain in a lower-viscosity state for a long time, to smoothly enter the micron-level and/or submicron-level holes on the surface of the ceramic and inside the ceramic, and form micron-level and/or submicron-level embedding structures on an interface.

To optimize a mechanical property of the resin, a specific amount of a reinforcing component may also be added to the resin. The reinforcing component may include one or more of glass fibers, carbon fibers, glass flakes, calcium carbonate, magnesium carbonate, silica, and talc.

In a specific implementation of the present invention, 66 wt % polybutylene terephthalate (PBT) and 34 wt % glass fibers are selected and used as a resin member material. In the injection molding process, the injection port temperature is 330° C., and the mold temperature is 260° C.

In an implementation of the present invention, after the injection molding process is completed, a machining method such as CNC (Computer Numerical Control, computer numerical control) may be used to perform fine structure processing on the resin part of the composite housing to obtain the target composite housing.

Certainly, the manner of bonding the ceramic and resin in the embodiments of the present invention may be further combined with another existing bonding manner, for example, further combined with riveting and macro-size hole glue pulling.

The preparation method provided in the embodiments of the present invention implements a tight bond between the ceramic and the resin under dual effects of physical embedding and a chemical reaction. On the one hand, the long-strip-shaped holes 103 that extend to the inside of the ceramic member are prepared through the loss on ignition of the organic fibers, and the resin infiltrates into the long-strip-shaped holes 103 to enhance bonding of the resin and the ceramic. On the other hand, the holes are enriched with the nitrogen compound through the impregnation; and in the injection molding process, the nitrogen compound has an exothermic reaction with the resin that infiltrates into the holes, to provide heat to keep the front end of the resin liquid flow used for injection molding continuously in a low-viscosity flow state. In this way, the resin infiltrates into the long-strip-shaped holes 103 smoothly, and the following problem is resolved to some extent: The resin cannot smoothly infiltrate into the holes because of an increase in viscosity of the front end of the resin liquid flow due to cooling. In addition, in the embodiments of the present invention, the holes are formed through the loss on ignition of the organic fibers. Integrity of a ceramic structure is not significantly damaged, and a strong acid and a strong alkali are not required. The loss on ignition of the organic fibers is completed in a ceramic sintering process, which is environment-friendly and energy-saving.

What is claimed is:

1. A ceramic resin composite housing, comprising a ceramic member and a resin member that is molded on the ceramic member through injection molding, wherein a surface that is of the ceramic member and that is bonded with the resin member comprises a plurality of long-strip-shaped holes extending from the surface to the inside of the ceramic member; the long-strip-shaped holes have an open hole structure; pore sizes of the long-strip-shaped holes range from 700 nm to 500 μm, and lengths of at least some of the long-strip-shaped holes are greater than 100 μm and less than or equal to 1000 μm; and the long-strip-shaped holes are filled with a resin material that constitutes the resin member, wherein the long-strip-shaped holes are formed through loss on ignition of organic fibers comprising between 0.1 and 5 percentage by weight.

2. The ceramic resin composite housing according to claim 1, wherein the long-strip-shaped holes extend in a winding manner from the surface of the ceramic member to the inside of the ceramic member.

3. The ceramic resin composite housing according to claim 1, wherein pore sizes at all positions of the long-strip-shaped holes are the same or basically the same.

4. The ceramic resin composite housing according to claim 1, wherein the pore sizes of the long-strip-shaped holes gradually increase as the long-strip-shaped holes extend from the surface of the ceramic member to the inside of the ceramic member.

5. The ceramic resin composite housing according to claim 1, wherein the pore sizes of the long-strip-shaped holes gradually decrease as the long-strip-shaped holes extend from the surface of the ceramic member to the inside of the ceramic member.

6. The ceramic resin composite housing according to claim 1, wherein a volume proportion of the plurality of long-strip-shaped holes in the ceramic member is 1% to 35%.

7. The ceramic resin composite housing according to claim 1, wherein an area proportion of the plurality of long-strip-shaped holes on the surface that is of the ceramic member and that is bonded with the resin member ranges from 1% to 60%.

8. The ceramic resin composite housing according to claim 1, wherein the plurality of long-strip-shaped holes are evenly distributed on the surface that is of the ceramic member and that is bonded with the resin member.

9. The ceramic resin composite housing according to claim 1, wherein the surface that is the ceramic member and that is bonded with the resin member further comprises a plurality of non-long-strip-shaped holes, and the non-long-strip-shaped holes are filled with the resin material that constitutes the resin member.

10. The ceramic resin composite housing according to claim 1, wherein a material of the ceramic member comprises one or more of an oxide ceramic material, a nitride ceramic material, and a carbide ceramic material.

11. The ceramic resin composite housing according to claim 1, wherein a material of the resin member is thermoplastic resin.

12. The ceramic resin composite housing according to claim 1, wherein the resin member further comprises a reinforcing component, and the reinforcing component comprises one or more of glass fibers, carbon fibers, glass flakes, calcium carbonate, magnesium carbonate, silica, and talc.

13. A terminal, comprising the ceramic resin composite housing according to claim 1.

14. A preparation method of a ceramic resin composite housing, comprising:
    preparing a ceramic member with a preset shape by using organic fibers comprising between 0.1 and 5 percentage by weight as a pore-forming agent, wherein a surface that is of the ceramic member and on which injection molding is pre-performed comprises a plurality of long-strip-shaped holes that extend from the surface to the inside of the ceramic member, the long-strip-shaped holes are formed through loss on ignition of the organic fibers, the long-strip-shaped holes have an open hole structure, pore sizes of the long-strip-shaped holes range from 700 nm to 500 μm, and lengths of at least some of the long-strip-shaped holes are greater than 100 μm and less than or equal to 1000 μm;
    performing impregnation on the ceramic member by using an aqueous solution that comprises a nitrogen compound to enable the aqueous solution that comprises the nitrogen compound to enter the long-strip-shaped holes, and then performing drying to attach a layer of the nitrogen compound to inner walls of the long-strip-shaped holes; and
    performing injection molding on the dried ceramic member, enabling a resin liquid to enter the long-strip-shaped holes to have an exothermic reaction with the nitrogen compound, and performing fine structure processing on a resin part after the injection molding is completed, to obtain a ceramic resin composite housing.

15. The preparation method according to claim 14, wherein the nitrogen compound comprises one or more of ammonia, a hydrazine compound and its derivative, and a water-soluble amine.

16. The preparation method according to claim 14, wherein a specific method for the preparing a ceramic member with a preset shape by using organic fibers as a pore-forming agent comprises one or more of an injection molding method, a tape casting method, a 3D printing method, a hot pressing method, and a slurry dipping and sanding method.

17. The preparation method according to claim 14, wherein the preparing a ceramic member with a preset shape by using organic fibers as a pore-forming agent comprises: mixing ceramic powder, the organic fibers, and a bonding agent to prepare a ceramic member green body, and sintering the ceramic member green body to obtain the ceramic member.

18. The preparation method according to claim 14, wherein the organic fiber comprises at least one of an artificial fiber and a natural fiber on which loss on ignition can be performed.

19. The preparation method according to claim 14, wherein the impregnation process is performed in a vacuum condition.

20. The preparation method according to claim 14, wherein ultrasonic vibration is performed in the impregnation process.

\* \* \* \* \*